US012651201B2

(12) United States Patent
Engle et al.

(10) Patent No.: US 12,651,201 B2
(45) **Date of Patent: \*Jun. 9, 2026**

(54) SOFTWARE APPLICATION FOR CONTINUALLY ASSESSING, PROCESSING, AND REMEDIATING CYBER-RISK IN REAL TIME

(71) Applicant: Conquest Technology Services Corp., Miramar, FL (US)

(72) Inventors: Jeffrey J. Engle, Pompano Beach, FL (US); Thomas R. Neclerio, Fort Lauderdale, FL (US); Ariel Posada, Coral Springs, FL (US)

(73) Assignee: Conquest Technology Services Corp., Miramar, FL (US)

( \* ) Notice: Subject to any disclaimer, the term of this patent is extended or adjusted under 35 U.S.C. 154(b) by 52 days.

This patent is subject to a terminal disclaimer.

(21) Appl. No.: 18/800,852

(22) Filed: Aug. 12, 2024

(65) Prior Publication Data

US 2025/0029009 A1　Jan. 23, 2025

Related U.S. Application Data

(63) Continuation of application No. 16/897,779, filed on Jun. 10, 2020, now Pat. No. 12,086,694.

(Continued)

(51) Int. Cl.
| | |
|---|---|
| *G06N 20/00* | (2019.01) |
| *G06F 18/214* | (2023.01) |
| *H04L 9/40* | (2022.01) |

(52) U.S. Cl.
CPC ........... *G06N 20/00* (2019.01); *G06F 18/214* (2023.01); *H04L 63/1416* (2013.01);
(Continued)

(58) Field of Classification Search
CPC ............. H04L 63/1416; H04L 63/1425; H04L 63/1433; H04L 63/20; G06F 21/577; G06F 18/214; G06N 20/00
See application file for complete search history.

(56) References Cited

U.S. PATENT DOCUMENTS

| | | | |
|---|---|---|---|
| 4,406,351 | A | 9/1983 | Littlejohn et al. |
| 5,440,301 | A | 8/1995 | Evans |

(Continued)

FOREIGN PATENT DOCUMENTS

| | | |
|---|---|---|
| WO | 2020185742 A1 | 9/2020 |
| WO | 2020252001 A1 | 12/2020 |

OTHER PUBLICATIONS

International Search Report for Corresponding International Application No. PCT/US2020/036967 mailed Aug. 25, 2020.

*Primary Examiner* — Amir Mehrmanesh
*Assistant Examiner* — Thomas A Gyorfi
(74) *Attorney, Agent, or Firm* — K&L Gates LLP

(57) ABSTRACT

A software based application for assessing, processing, and remediating cyber-risk in real time may comprise, without limitation, a profiling component, an analytic component, an evaluation component, and a monitoring component which may, in conjunction therewith, operate to allow an organization to adaptively adjust an organization's network security to continuously improve and mature same. Such components may operate to: (1) determine an organization's operational baseline; (2) identify risks and hazards inherent therein; (3) generate, and verify the efficacy of, remedial controls to such risks and hazards; (4) document and audit such determinations; and (5) continually monitor the organization's network security. In such a manner, the network security architecture of an organization may be remediated according to threat scenario-based control efficacy and (Continued)

10

100

| Data Feeds 20 | → | Profiling Component 110 |
| | | Analytic Component 120 |
| | | Evaluation Component 130 |
| Data Warehouse 30 | ← | Documentation Component 140 |
| | | Implementation Component 150 |
| | | Validation Component 160 |
| Machine Learning Component 40 | | Monitoring Component 170 | residual risk determinations according to the agnostic, risk-focused, and system-based approach disclosed herein.

20 Claims, 10 Drawing Sheets

Related U.S. Application Data

(60) Provisional application No. 62/859,414, filed on Jun. 10, 2019.

(52) U.S. Cl.
CPC ...... *H04L 63/1425* (2013.01); *H04L 63/1433* (2013.01); *H04L 63/20* (2013.01)

(56) References Cited

U.S. PATENT DOCUMENTS

| | | |
|---|---|---|
| 9,003,231 B1 | 4/2015 | Graves |
| 12,086,694 B2 * | 9/2024 | Engle .................. G06F 18/214 |

| | | |
|---|---|---|
| 2002/0057204 A1 | 5/2002 | Bligh |
| 2007/0236352 A1 | 10/2007 | Allen et al. |
| 2008/0314681 A1 | 12/2008 | Patel et al. |
| 2013/0053063 A1 | 2/2013 | McSheffrey |
| 2013/0298192 A1 | 11/2013 | Kumar et al. |
| 2015/0379862 A1 | 12/2015 | Jones, Jr. et al. |
| 2016/0232774 A1 | 8/2016 | Noland et al. |
| 2016/0247369 A1 | 8/2016 | Simmons |
| 2016/0284174 A1 | 9/2016 | Connell, II |
| 2017/0109529 A1 | 4/2017 | Kraft |
| 2017/0124842 A1 | 5/2017 | Sinha et al. |
| 2017/0295199 A1 | 10/2017 | Kirti et al. |
| 2018/0330586 A1 | 11/2018 | Albreth, Jr. et al. |
| 2018/0375576 A1 | 12/2018 | Stout et al. |
| 2018/0375892 A1 | 12/2018 | Ganor |
| 2019/0145648 A1 | 5/2019 | Sinha et al. |
| 2019/0207968 A1 | 7/2019 | Heckman et al. |
| 2019/0266860 A1 | 8/2019 | Lakshmipathy et al. |
| 2020/0145775 A1 | 5/2020 | Cardinaux et al. |
| 2020/0162497 A1 | 5/2020 | Narayan |
| 2020/0211358 A1 | 7/2020 | Burke et al. |
| 2020/0294372 A1 | 9/2020 | Rodriguez |

* cited by examiner

10

Start

Identify Threat 310

Event Complexity 321

Availability 322

Adversary Prevalence 323

Level of Ideology 324

Organization Capabilities 325

Intent 326

Historical Frequency 327

Facility Involvement 328

320

Historical Basis 331

Adversary Capabilities 332

Threat Variations 333

330

Asset Determination 341

CARVER Analysis 342

Determine CARVER Score 343

340

Identified Threat 135

300

SOFTWARE APPLICATION FOR CONTINUALLY ASSESSING, PROCESSING, AND REMEDIATING CYBER-RISK IN REAL TIME

CLAIM OF PRIORITY

This application is a continuation application claiming priority under 35 U.S.C 120 to U.S. patent application Ser. No. 16/897,779, titled SOFTWARE APPLICATION FOR CONTINUALLY ASSESSING, PROCESSING, AND REMEDIATING CYBER-RISK IN REAL TIME, filed Jun. 6, 2020, now U.S. Publication No. 2020/0389482, which makes a claim of priority to U.S. provisional patent application having Ser. No. 62/859,414 and a filing date of Jun. 10, 2019, which is hereby incorporated herewith in its entirety.

BACKGROUND OF THE INVENTION

Field of the Invention

The present invention is directed to a software application and/or system designed to allow a user and/or organization to continually assess, monitor, and remediate cyber-risk in real time.

Description of the Related Art

Over the past few years, organizations have been subject to external cyber-attacks resulting in the exposure of sensitive data including, but not limited to, personal identifying information, organization trade secrets, and proprietary data. Ultimately, organizations have spent millions of dollars reacting to, and remediating the effects of, such attacks. As a result, executive management and Chief Information Security Officers have spent long periods of time assessing their operational ecosystem, inclusive of internal and external parties, in attempts to accurately identify and determine where their vulnerabilities lie.

Traditional cybersecurity protocols, however, remain inadequate for a variety of reasons. First and foremost, because traditional cyber-risk controls are typically dispatched to an organization's network security architecture in a reactive manner, and thereby are only disposed to prevent or otherwise limit the effects of the previously used tools, tactics, and procedures of malicious actors, such cybersecurity controls and network architectures are often inadequate to deal with the constantly evolving cyber attacking software, tools, techniques, and tactics used by malicious actors. Specifically, because organizations often must respond to cyber-attacks in a reactive manner, often relying on historical data to design and implement their control systems, such control systems are often out-of-date, and unsuitable for the new threats such control systems may encounter. In this manner, system defenders are often at least one step behind, as they merely react to already identified attacks, whilst remaining unprepared to prevent or adequately defend against future attacks. Likewise, given the ever increasing complexity of network architecture, and the plethora of data which may be of interest to malicious actors, it may be understood the evolution of cyber-risks continues to grow at an exponential rate. Accordingly, as the number of devices containing a microprocessor continues to grow, so too grows the ability of cyber-threats to access a given system.

Consider, for instance, the history of malware. Although malware, such as computer viruses, worms, Trojans, and backdoors, has been one of the most frequently used tools in cyber-attacks since the 1980s, and has principally operated under the same tactics of installing and hiding malicious software on a computer, server, client, or computer network, malware design and functionality continues to evolve in unique manners. Accordingly, the anti-malware programs of only a few years ago are often insufficient protection to the users thereof, as new malware is designed to avoid detection therefrom. Likewise, as devices which fall under the Internet-of-Things umbrella continue to be developed, the avenues through which malware may operate continues to expand.

Moreover, the aforementioned realities under which cyber-security networks operate is only exacerbated by the current risk management platforms and approaches to cyber-risk compliance. Specifically, current integrated risk management platforms and traditional approaches to cyber-risk compliance operate under a static point in time assessment strategy. Generally speaking, such approaches typically involve an investigation into an organization's cyber-risk maturity at a given point in time. However, such assessment strategies fail to take into account the constantly evolving nature of cyber-threats, and, accordingly, provide a false sense of security to their users. Moreover, as such assessment strategies operate under such a static point in time arrangement, valuable time and resources are often spent preparing for such assessment, thereby preventing the allocation of such time and resources on the implementation and testing of valuable new controls, planning, training, and implementations.

Accordingly, there remains a need to ensure cyber-security networks are kept up-to-date, and are being developed in a proactive manner. A solution to such problems should comprise, for instance, a system, an application, and/or platform designed to apply real world changes to a network's cyber-risk maturity, and enable an organization to manage their increasingly complex cyber-risk management networks and protocols in real-time. Such a solution should likewise be disposed to reduce the amount and expense of technical resources necessary for such operations, while likewise being disposed to achieve greater levels of compliance, maturity, and effectiveness. Specifically, such a system, application, and/or platform should be disposed to facilitate the process of enterprise-wide cyber-risk management including, but not limited to, internal and external workforces, third-party vendors, third-party partnerships, internal and external users, data, physical hardware systems, software based virtual systems, platforms, and applications. Accordingly enterprises incorporating such a system, application, and/or platform may be able to predict and prevent risk scenarios through adaptation of an organization's operational environment, thereby allowing for such organizations to adapt to actual threats in near to real time.

SUMMARY OF THE INVENTION

The present invention is directed towards a software based, web enabled software-as-a-service (SaaS) application for the processing of cyber-risk in real time. In this sense, and as used herein, the processing of cyber-risk in real time may comprise for instance, and without limitation, assessing, analyzing, evaluating, remediating, implementing remedial actions therefor, rectifying, changing, altering, improving, or otherwise taking action directed towards the cybersecurity of a user and/or organization in accordance with the disclosure of the present invention. Such an application may be disposed on premise, or in the cloud, may be focused on a framework agnostic, risk focused, and system-based approach, and may be comprised of software coding and a graphic user interface. As used herein, the terms "user," "organization," and equivalents thereto are intended to be used interchangeably, thereby indicating the user may be an organization, which may comprise a plurality of users, or vice versa.

The components of such an application are generally comprised of data feeds fed into a software-based data collection engine, technical controls, administrative policies, and physical access controls. Such an application may further utilize multiple matrices and methods to support an algorithm disposed to make modifications and/or changes to operational controls and make comparisons incorporating such changes to established thresholds, thereby allowing for near to real-time cyber compliance maturity, and effectiveness, promoted by such modification functionality. Such matrices may be disposed to index controls to determine the monitoring regime and implementation requirements specific to the pertinent organization. Moreover, such an application may be disposed to aggregate data feeds from a plurality of sources, including third-party vendor integration. Specifically, such data feeds may be fed into a collector and normalized before submission to a staging database according to a common schema. Moreover, such data feeds may be aligned to controls and presented to the user and/or organization via a widget, which may comprise a product of direct data feeds, multiple data feeds, the product of data feeds, and/or other widgets.

In such manner, an application in accordance with at least one embodiment of the present invention may provide the ability to adaptively adjust an organization's network security architecture to continuously improve and mature same. For instance, the application of the present invention may be disposed to automatically applied controls or other risk responses to an organization's network security architecture by, without limitation, physically altering documents, changing configurations, blocking access and ports, and engaging physical controls.

More specifically, the application or system of the present invention may comprise a plurality of components disposed to, in general terms: (1) determine a user's operational baseline network security compliance, maturity, and effectiveness at a control-based level; (2) identify risks and hazards inherent in such operational baseline network security according to developed threat frameworks; (3) generate, and verify the efficacy of, remedial controls to such risks and hazards, both at an individual control-based level, as well as part of an integrated cyber-security network architecture; (4) document and audit the aforementioned components and procedures; and (5) continually monitor, assess, and improve a user's network security through continuous, periodic, or at will reapplication of at least some of the components disposed within the present invention. Such components may comprise, for instance, and without limitation, a profiling component, an analytic component, an evaluation component, a documentation component, an implementation component, a validation component, and a monitoring component. Each of these components will be discussed in greater detail hereafter.

As previously stated, the application or system of the present invention may comprise a profiling component. Specifically, the profiling component of a system in accordance with the present invention may be disposed to effectively evaluate a user's physical and virtual network security environment, at a control-based level. Alternatively put, the profiling component of the present invention may evaluate a user's network security compliance, maturity, and effectiveness at a control level. Through such an evaluation, the system of the present invention may then determine the operational baselines of a user's network security architecture.

The profiling component of the present invention may assess a user's network security architecture through a variety of methods. For instance, the profiling component may use an automated self-assessment provided through one or more questionnaires, or like procedures intended to elicit network security information from a user and/or organization. Likewise, the profiling component may instead utilize an assessment carried out by a qualified third-party. In conjunction therewith, such profiling component may be disposed in connection with an end-user profile framework, wherein such end-user profile framework is derived from industry size, locality, sites, systems, and sectors associated with the organization, and is structured such that the end-user may review and revise such end-user profile framework. For instance, the end-user may opt to detail how individuals operate within the organization, as well as provide additional information as to the organization's systems, networks, data, and applications which support the organization's mission and business processes.

Further, the profiling component in accordance with at least one embodiment of the present invention may comprise a variety of different tasks disposed to identify the compliance, maturity, and effectiveness of each control disposed within a user's cybersecurity network. For instance, such a profiling component may be disposed to perform asset discovery and inventory tasks, system profiling, determine requirements dependent upon a user's organizational operations, and select and analyze individual controls, both as a discrete part and as a portion of the network architecture as a whole. Accordingly, the profiling component may produce a complete inventory and criticality assessment while prioritizing all systems, subsystems, data, networks, end points, and users.

In accordance with at least one embodiment of the present invention, disposed in connection with the aforementioned profiling component may be an analytic component. Such an analytic component may generally be disposed to structure, determine, or otherwise generate at least one, or in some instances a plurality of, considered variables. Such considered variables may be enabled through key data gathered from the baseline rendered from the profiling component and may include, without limitation: (a) threat agents; (b) actors; (c) tactics, techniques and procedures; (d) assets and their criticality; and (e) the criticality and volatility of the already implemented controls in a user's network security environment. Further, utilizing such considered variables, such an analytic component may development a threat framework therefrom, which may constitute a complete theoretical threat which may be issued to the user's baseline.

In this sense, the analytic component may be disposed to determine a user or organization's target state. Such a target state may comprise, for example, a target level of compliance, maturity, and effectiveness of the organization's cybersecurity network, and may be automatically determined by the system of the present invention. Conversely, such a target state may instead be configured according to the risk appetite of the organization. Accordingly, the analytic component aims to determine the pertinent considered variables impeding a given network architecture's security efficacy, while developing a target state for which the organization may aim.

As may be understood, by analyzing the user's baseline and developing such considered variables, the application and/or system of the present invention may effectively perform a dynamic risk analysis, of which the threats, vulnerabilities, and assets are the main considered variables, while likewise determining the amount of monitoring and level of implementation priority given to each control, response, and/or treatment according to the criticality and volatility of the already implemented controls.

For instance, in conjunction with such a profiling component and analytic component, at least one embodiment of the present invention may further comprise an evaluation component. Such an evaluation component may comprise, for example, a risk engine disposed to evaluate the already established baselines for asset criticality, threat, and vulnerability according to the threat framework developed by the analytic component.

Specifically, such an evaluation component may, for example, utilize the threat framework to organize and orchestrate theoretical threats against an organization's determined baseline network security. In such manner, certain threat agents, tactics, techniques, and procedures may be analyzed using a variety of models. For instance, in at least one embodiment of the present invention, the risk engine component may be disposed to utilize the adversary-defender model to identify specific vulnerabilities and remediation steps present in the organization's baseline. In accordance with the application of such a threat framework, which may comprise certain considered variables which thereby constitute a complete theoretical threat, it may be understood the evaluation component may subsequently, in at least one embodiment of the present invention, designate certain threat frameworks as an identified threat. Such an identified threat may comprise, for example a design basis threat, and is disposed to illustrate a given threat which is deemed both unacceptable, as it pertains to the level of risk associated with such threat and the current baseline of the cybersecurity network, and treatable, in the sense there remain certain remedial actions which may be enacted. Accordingly, where a given threat framework creates a threat which falls within such a threshold, wherein a reasonable user would develop a response to a scenario, such threat framework may be designated as an identified threat, and the specified considered variables in accordance with such an identified threat may be therefore identified.

Utilizing such identified threats, the evaluation component may then, m at least one embodiment of the present invention, determine the baseline risk of the current cybersecurity network. Likewise, the evaluation component may further generate theoretical controls, designed to remediate the risk identified by such identified threat(s).

Moreover, evaluation of such theoretical controls by the aforementioned evaluation component may yield certain data, such as the criticality and volatility of such theoretical controls. As may be understood, the criticality of such a theoretical control may represent the efficacy of such control in remediating the identified threat. Likewise, the volatility of such a theoretical control may represent the frequency with which such theoretical control may remediate the identified threat. In this manner, each theoretical control may be effectively assessed, wherein the product of such criticality and volatility assessment may provide an implementation priority. As may be understood, the implementation priority may be disposed to direct the implementation of such theoretical controls, by representing the overall efficacy of such theoretical controls, as applied to the baseline cybersecurity network in light of the identified threat. In this manner, it may be understood certain theoretical controls may be determined to comprise a higher level of necessity, given the efficacy and frequency with which such theoretical control may remediate a given identified threat.

Further, in at least one embodiment of the present invention, a documentation component may be utilized in conjunction with such aforementioned components to record such identified threats and implementation priorities, as well as further relevant data, such as decisions made thereto, exceptions applied thereto, and developed mitigating plans. In this manner, a system in accordance with at least one embodiment of the present invention may allow an organization to maintain sufficient documentation pertinent to their cybersecurity compliance, maturity, and effectiveness. Such documentation may, be used, for instance, in deciding whether to implement certain remedial controls, determining appropriate values for residual risk, generating risk management strategies at an organizational level, training employees, and determining an appropriate remediation strategy in the event a threat scenario 1s realized m the physical environment.

In conjunction with the aforementioned components, at least one embodiment of the present invention may further provide an implementation component, disposed to direct, coordinate, or otherwise implement remedial controls gathered from the aforementioned evaluation component. In so doing, the implementation component may utilize, for instance, the aforementioned identified threats, theoretical controls, and implementation priority gathered from such evaluation component to direct the technical implementation of certain remedial controls. For instance, in the event the evaluation component identifies an identified threat, the system in accordance with the present invention may subsequently identify at least one, and in some instances, a plurality of theoretical controls which may remediate such identified threat. Based on the criticality and volatility values of such theoretical controls, an implementation priority for each control will be determined, wherein such implementation priority may be used to determine which theoretical control should be implemented, and the technical aspects such theoretical control should be implemented with.

Alternatively put, the implementation component of at least one embodiment of the present invention is disposed to only direct, coordinate, or otherwise implement a remedial control once such control, and the technical implementation therefor, has been generated through the evaluation component. For instance, as may be understood, because of the complexity of cybersecurity networks, it is possible a theoretical control may be ideal in protecting an organization against a particular identified threat. However, it is also possible such theoretical control may likewise expose the organization to a number of alternative threats. Accordingly, the evaluation component aims to determine the appropriate theoretical control which best serves the interests of the organization, both as to the level of acceptable risk and the organization's goals. In this manner, once the system of the present invention reaches such implementation component, an appropriate remedial control has been determined by such evaluation component.

Further, the implementation component of the present invention may likewise comprise a notification component, designed to notify and inform the user and/or organization of the appropriate remedial control, the pertinent data associated with such remedial control, such as data pertaining to, for instance, analytical options, risk treatment options, and the risk dynamics impact on the identified threat. Such notification component may notify the user and/or organization through a plurality of appropriate notifications means, such as, without limitation, email or text messaging systems. As may be understood, such notification component may further be disposed in input-output relation with the system of the present invention, thereby allowing a user to authorize the implementation of such remedial controls. Accordingly, in this manner, the implementation component of the present invention may be designed to automatically implement such remedial controls, or alternatively, request approval prior to such implementation.

Upon implementation of such remedial control(s), at least one embodiment of the present invention may further comprise a validation component, disposed to test and validate the efficacy of such remedial control. For instance, such a validation component may, upon implementation of such remedial control, reapply the aforementioned evaluation component to determine whether the same, or any alternative, identified threats are present in the remediated network architecture. In so doing, the efficacy of such remedial control may be evaluated, both at a discrete individual control-based level, and as part of a network architecture as a whole. In this manner, the compliance, maturity, and effectiveness of an organization's network security architecture may be both enhanced, and continually tested, thereby ensuring the organization is continually monitoring and adapting their cybersecurity network in real-time.

Further, in at least one embodiment of the present invention, a monitoring component may be disposed in connection therewith. As may be understood, such a monitoring component may monitor the organization's cybersecurity network, for the identification of both real-world threats, and ineffective controls. In accordance therewith, such a monitoring component may further be disposed to provide certain documentation and auditing procedures, thereby continually monitoring and remediating an organization's cybersecurity compliance, maturity, and effectiveness. For instance, such a monitoring component may be disposed to perform certain risk assessment, impact analysis, and reporting tasks designed to identify where an organization's network security may improve.

In accordance with the aforementioned components of the present invention, such a system may further comprise yet additional components designed to further improve a user and/or organization's cybersecurity in real time. For instance, such a system, in at least one embodiment of the present invention, may further comprise a machine learning component disposed in connection with the system of the present invention and an interconnected data warehouse. In this manner, such a machine learning component may be disposed to improve certain components of the present invention, such as, for instance, the evaluation component and the implementation component, according to training provided by the organization and/or end-users.

For instance, such a machine learning component may, upon the training provided through both real world and hypothetical scenarios enacted through the system of the present invention, determine appropriate instances for notifications, assignments, and improvements to decision making. In such manner, by continually tracking, for instance, real-world threat scenarios, end-user decision making and inputs, and the efficacy of remedial controls, the machine learning may, for instance, develop more appropriate threat frameworks to be applied to a user's baseline network. In so doing, the machine learning component may be used to ensure the threat frameworks proffered through the system of the present invention remain up-to-date, thereby allowing the security network of users and/or organizations to remain disposed in the present, and not at some static point of time in the past.

These and other objects, features, and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As previously detailed, the present invention is directed towards a software based, web enabled software-as-a-service (SaaS) application for processing cyber-risk in real time. As previously stated, the processing of cyber-risk in real time may comprise for instance, and without limitation, assessing, analyzing, evaluating, remediating, implementing remedial actions therefor, rectifying, changing, altering, improving, or otherwise taking action directed towards the cybersecurity of a user and/or organization in accordance with the disclosure of the present invention. Such an application may be disposed on premise or in the cloud, and may be disposed in connection with at least one memory and at least one processor for the implementation thereof. Generally speaking, such an application may be focused on a framework agnostic, risk focused, and system-based approach, and may generally comprise software coding and a graphic user interface.

Figure 1:
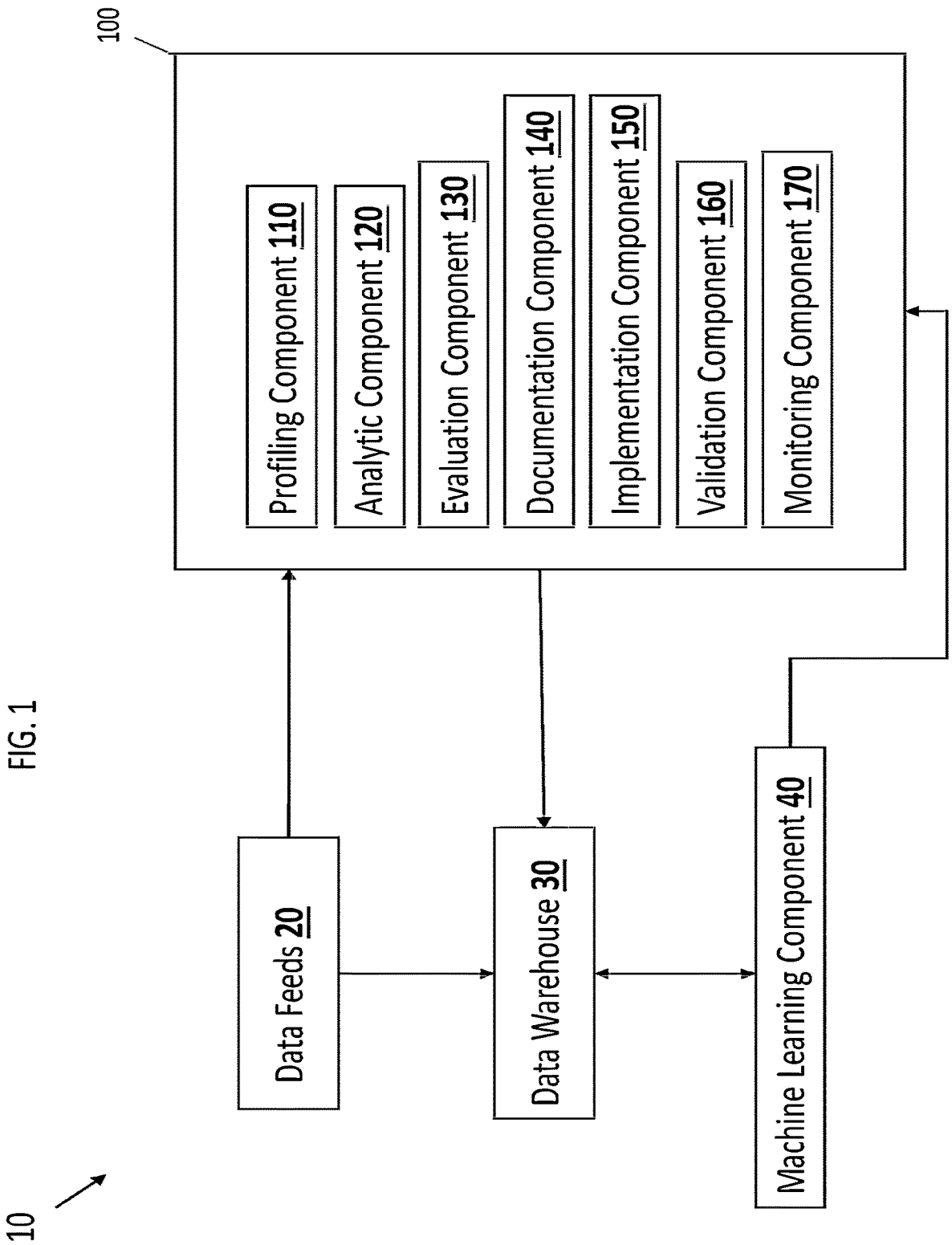
FIG. 1 depicts a schematic representation m block-diagram form of a system for assessing, processing, and remediating cyber-risk in real time, in accordance with at least one embodiment of the present invention.

More specifically, and with specific reference to the embodiment of the present invention depicted in FIG. 1, such a application 10 may generally comprise a system 100, which may be comprised of a plurality of discrete but interconnected components. Such components may include, for instance, a profiling component 110, an analytic component 120, an evaluation component 130, a documentation component 140, an implementation component 150, a validation component 160, and a monitoring component 170. Further, as may be seen in FIG. 1, such a system 100 may be disposed in connection with data feeds 20, a data warehouse 30, and a machine learning component 40. Each of these interconnections with the system 100 will be discussed in greater detail hereafter.

Figure 2:
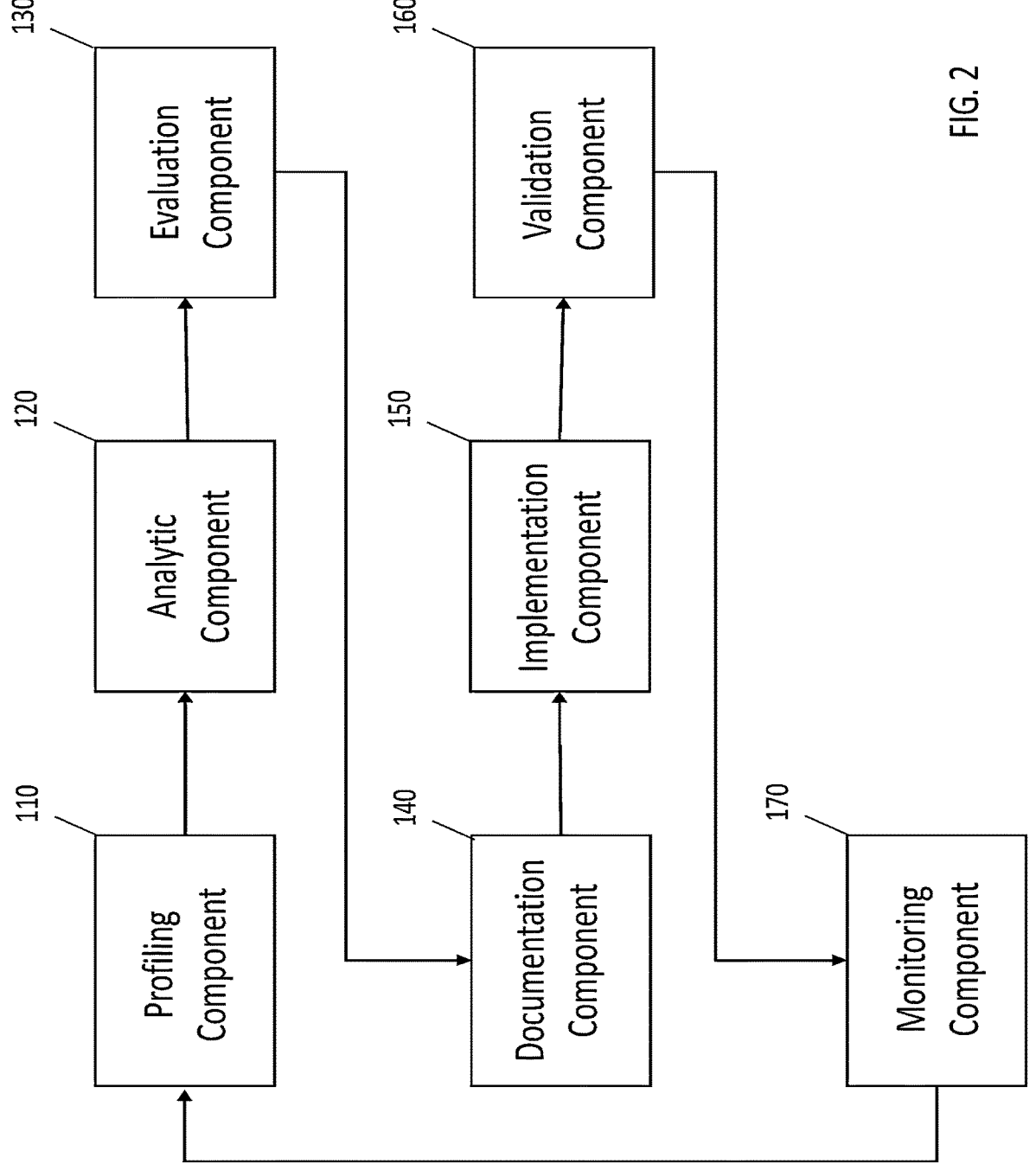
FIG. 2 depicts a schematic representation m block-diagram form of a system for processing cyber-risk in real time, in accordance with at least one embodiment of the present invention.
Figure 3:
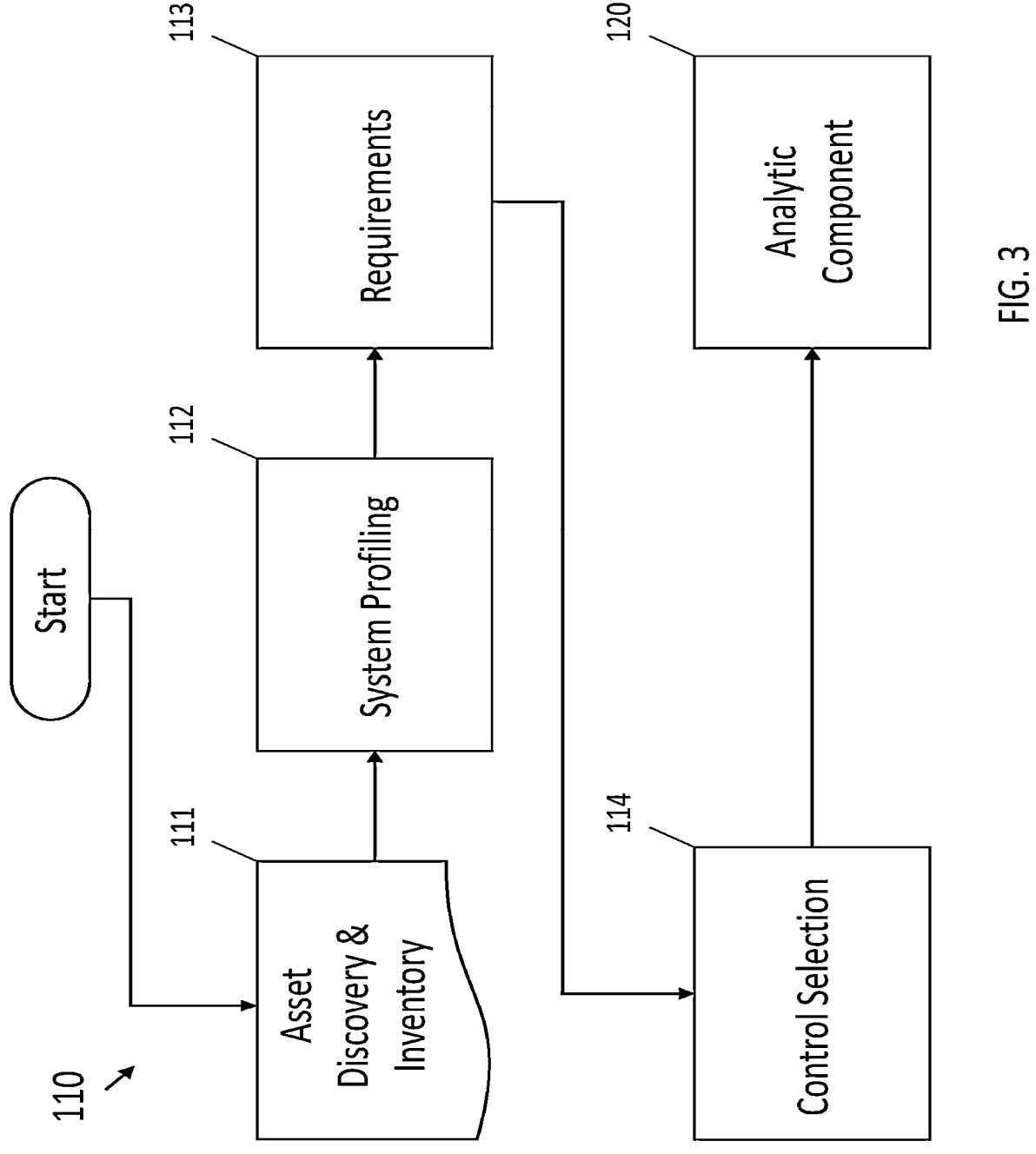
FIG. 3 depicts a schematic representation m block-diagram form of a profiling component in accordance with the embodiment of the present invention depicted in FIG. 2.

As depicted in FIGS. 1-3, and as previously stated, at least one embodiment of the present invention may include a system 100 comprising a profiling component 110. Such a profiling component 110 may be disposed to assess a user's network security architecture at the control level through a variety of methods. For instance, such a profiling component 110 may assess an organization's compliance, maturity, and effectiveness at such a control level automatically, through at least one questionnaire, or alternatively, through an assessment proffered by a qualified third-party.

Such a profiling component 110 may further be disposed to perform a variety of tasks in conjunction with the data gathered from assessments, whether self-automated, independently proffered by a qualified third-party, or otherwise. For instance, asset discovery and inventory tasks 111 may be utilized to provide network visibility, uncover hardware devices, and any connections therewith. Likewise, such profiling component 110 may be disposed to perform system profiling tasks 112, designed to uncover specific details about the hardware and software present in an organization's network architecture. Further, the profiling component 110 may be disposed to discern the security requirements 113 of the organization. As may be understood, such security requirements 113 may differ dependent upon the applicable organization, thereby effecting the acceptable risk threshold for given threats. Moreover, certain sources of data providing indicators, such as data feeds 20, may be connected to the system 100 to enable connectivity to any necessary information ingest engines.

Finally, such a profiling component 110 may also perform control selection tasks 114. Specifically, such a profiling component 110 may index the controls already implemented within an organization's network architecture. In so doing, the profiling component 110 may develop a user and/or organization's baseline. Accordingly, such a baseline may comprise, for instance, such controls, requirements, and hardware and software-based details about the organization's network security as it currently stands. In this manner, the profiling component 110 may develop a baseline from which threats and remedial controls 151 may be developed, tested, and validated to ensure such remedial controls 151 are effective in augmenting the compliance, maturity, and effectiveness of a user and/or organization's cybersecurity network. As may be understood, such a baseline may be indicative of the organization's priorities, mission and/or business processes, and system importance from the perspective of both the organization and any end-user profiles.

In at least one embodiment of the present invention, an analytic component 120 may be disposed in connection with such profiling component 110, as depicted in FIGS. 1-4. As previously stated, such an analytic component 120 may generally be disposed to identify at least one, and in some instances a plurality, of considered variables. Such considered variables may comprise, for instance, threat agents, actors, tactics, techniques and procedures, assets and their criticality, and the criticality and volatility of the organization's already implemented controls. As may be understood, such considered variables may be determined, at least in part, through the key data gathered from the baseline rendered by the profiling component 110.

Specifically, such an analytic component 120 may be disposed to perform a variety of tasks and assessments to determine a threat framework 129 using such considered variables. For instance, such an analytic component 120 may perform a variety of tasks including, but not limited to, threat identification 121, vulnerability identification 122, determination of the likelihood of occurrence 123, determination of the magnitude of impact, 124, risk determination 125, communication of results 126, assessments 127, and facility involvement determinations 128. As may be understood, such tasks may be disposed to assist in the development of a threat framework 129, wherein a complete threat scenario is developed, according to the applicable considered variables and the organization's baseline. In this manner, the analytic component 120 may develop a complete threat framework 129, which may then be evaluated against a user's baseline to determine whether such a threat framework 129 may prove problematic to the organization as it currently stands. Further, at least one embodiment of the present invention may allow for a user and/or organization to adjust or otherwise develop such a threat framework 129 as it sees fit.

Figure 4:
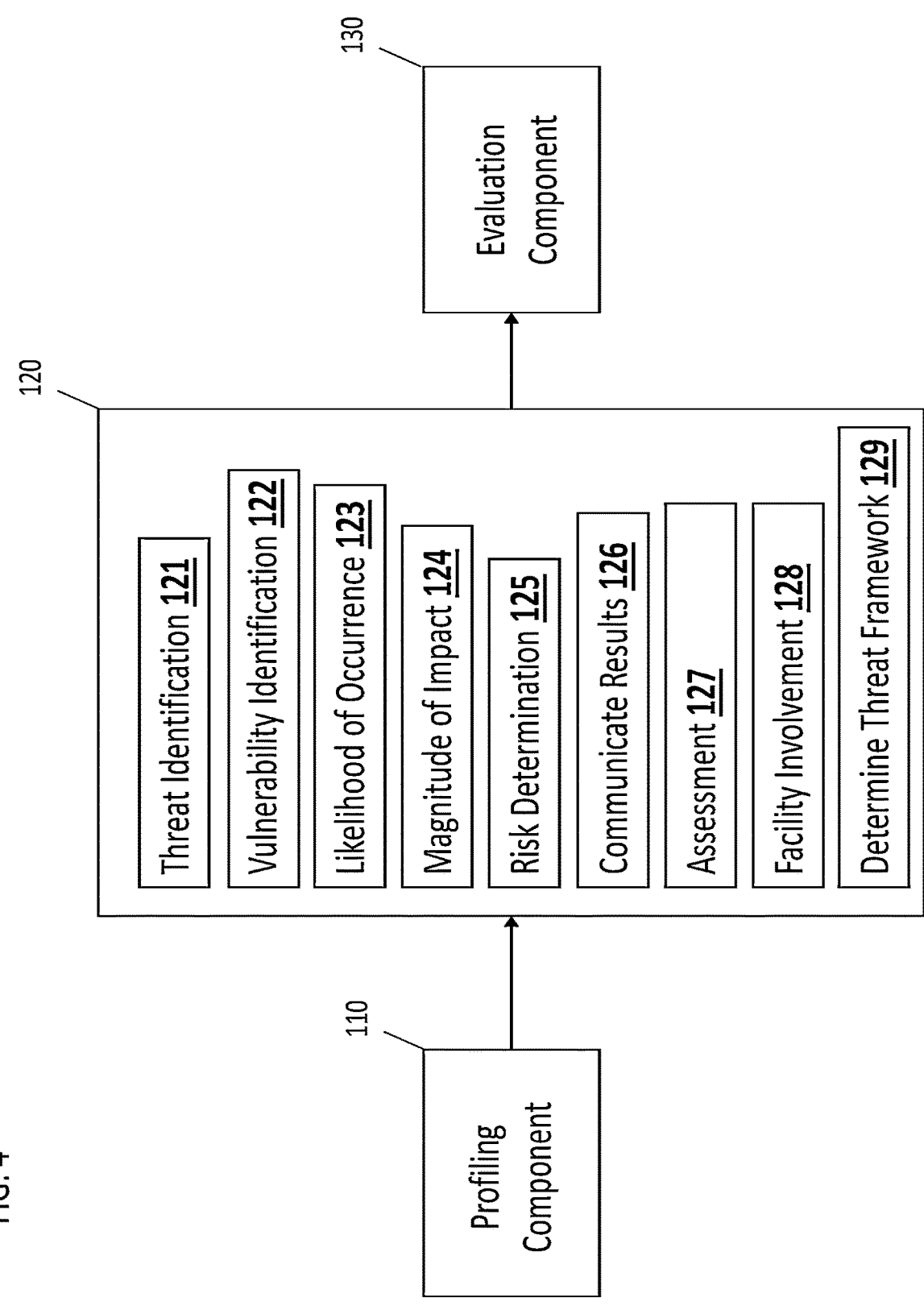
FIG. 4 depicts a schematic representation in block-diagram form of an analytic component in accordance with the embodiment of the present invention depicted in FIG. 2.
Figure 4A:
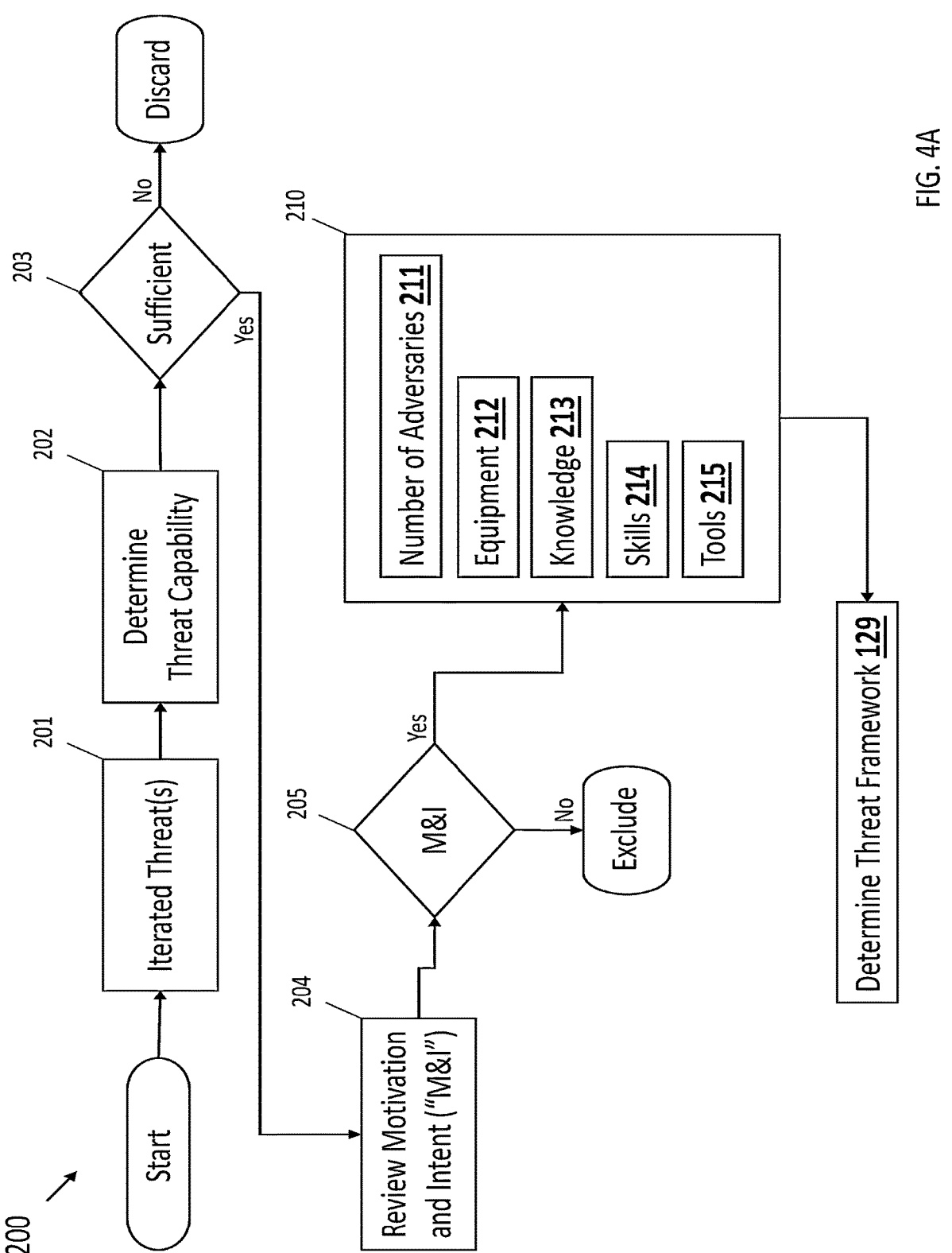
FIG. 4A depicts a schematic representation in block-diagram form of a method for determining a threat framework in accordance with the embodiment of the present invention depicted in FIG. 4.

One method of determining such a threat framework 129, as may be used in at least one embodiment of the present invention, may be seen with reference to FIG. 4A. As may be seen, such an analytic component 120 may comprise an analytic routine 200 disposed to determine at least one threat framework 129. Specifically, such an analytic method 200 may comprise a plurality of steps disposed to determine such a threat framework 129. For instance, the analytic method 200 may iterate a plurality of threats 201 and determine the capability 202 of such iterated threats, thereby determining whether such an iterated threat 201 is sufficient, both as to capability and intent, to compromise an organization's baseline network security, as determined in the aforementioned profiling component 110. In the event such an iterated threat 201 is deemed sufficient, such an analytic method 200 may then review the motivation and intent 204 behind such an iterated threat 201. Where such motivation and intent is deemed to correspond 205 with the organization's business, pertinent data, and security requirements, such an analytic method 200 may then classify 210 such iterated threat 201 according to certain pertinent data, thereby building the profile of the iterated threat 201. For instance, such classification tasks 210 may be disposed to determine, without limitation, the number of adversaries 211, the adversarial equipment 212, the adversarial knowledge 213, the adversarial skills 214, and the adversarial tools 215 present in such an iterated threat 201. With such pertinent data gathered through such an analytic method 200, it may be understood a complete threat framework 129 may be obtained therefrom.

In accordance with such an analytic component 120, at least one embodiment of the present invention may further dispose an evaluation component 130 in connection therewith. Such an evaluation component 130, which may be seen with specific reference to FIGS. 5-5A, may comprise, for example, and without limitation, a risk engine disposed to evaluate the already established baselines and threat framework(s) 129 to determine asset criticality, threat, and vulnerability. For instance, and without limitation, such an evaluation component 130 may utilize golden images in a sandbox environment to evaluate the threat framework 129 in light of the user and/or organization's baseline. Conversely, such an evaluation component 130 may instead access a subset of approved nodes and run such a threat framework 129 therein, thereby assessing such threat framework 129 for the real-world impacts associated therewith. As may be understood, such real-world impacts may then be extrapolated across the user's network security architecture to obtain a broader evaluation as to the risk presented by such threat framework 129.

In this manner, the evaluation component 130 may generally be disposed to identify specific threat framework(s) 129 which may comprise the organization's baseline to a certain threshold, thereby indicating such a threat framework 129 should constitute an identified threat 135. Specifically, such an identified threat 135 may comprise a threat framework 129 deemed unacceptable, as to the level of risk presented through such threat framework 129, but also treatable, meaning a responsible party would develop a response to such a scenario. Accordingly, there remains a specified threshold in which any given threat framework 129 may be deemed an identified threat 135, for subsequent actions in accordance therewith.

More specifically, the evaluation component 130 in accordance with at least one embodiment of the present invention may perform a plurality of appraisal tasks disposed to determine whether such a threat framework 129 should be deemed an identified threat 135. In such manner, certain threats, agents, tactics, procedures, etc. against an organization's determined baseline may be tested and analyzed through a variety of models. For instance, in at least one embodiment of the present invention may analyze such threat frameworks 129 using the adversary-defender model to identify specific vulnerabilities and remediation steps present in the organization's baseline.

Figure 5:
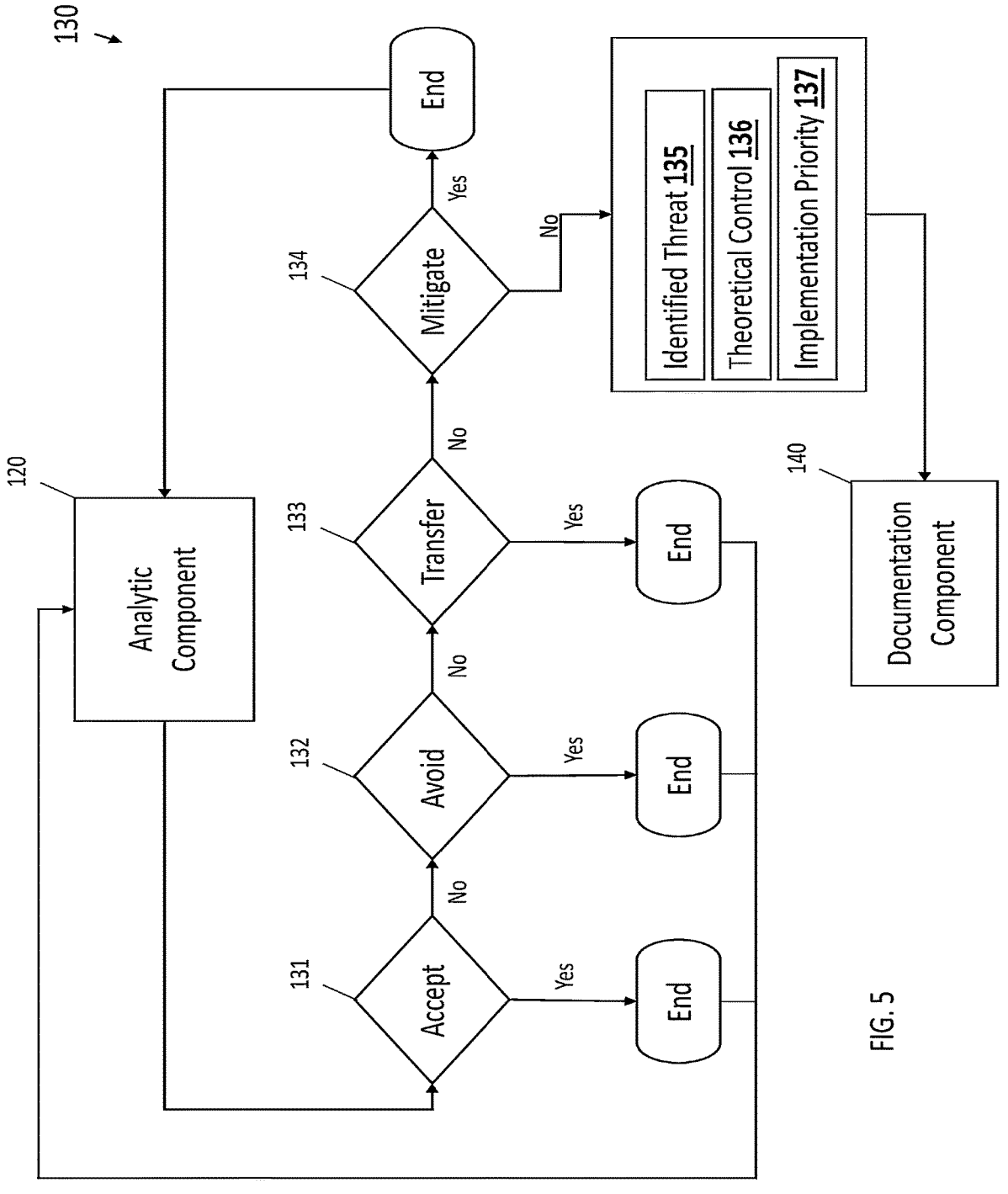
FIG. 5 depicts a schematic representation m block-diagram form of an evaluation component in accordance with the embodiment of the present invention depicted in FIG. 2.

For instance, such appraisal tasks to be performed by the evaluation component 130 of at least one embodiment of the present invention may be seen with specific reference to FIG. 5. As may be seen, such an evaluation component 130 may be disposed to analyze the relevant threat framework 129 according to certain decision-making processes. For instance, such an evaluation component 130 may determine: (1) whether the threat framework presents an acceptable amount of risk 131; (2) whether the threat framework 129 may be avoided 132 through alternative means; (3) whether the risk presented by such threat framework 129 may be transferred 133 elsewhere; and (4) whether the risk presented by such threat framework 129 may be mitigated 134 through means already present in the user and/or organization's baseline network security architecture. As may be seen, in the event such threat framework 129 is either acceptable, avoidable, transferrable, or mitigatable, the evaluation component 130 will end as to that specific threat framework 129 and begin evaluation of a further threat framework 129. Likewise, if such threat framework 129 is neither acceptable, avoidable, transferable, nor mitigatable, the evaluation component 130 will progress to the classification of an identified threat 135, the determination of at least one theoretical control 136 to remediate such identified threat 135, and the calculation of an implementation priority 137 disposed to indicate the primacy of such theoretical control(s) 136.

Figure 5A:
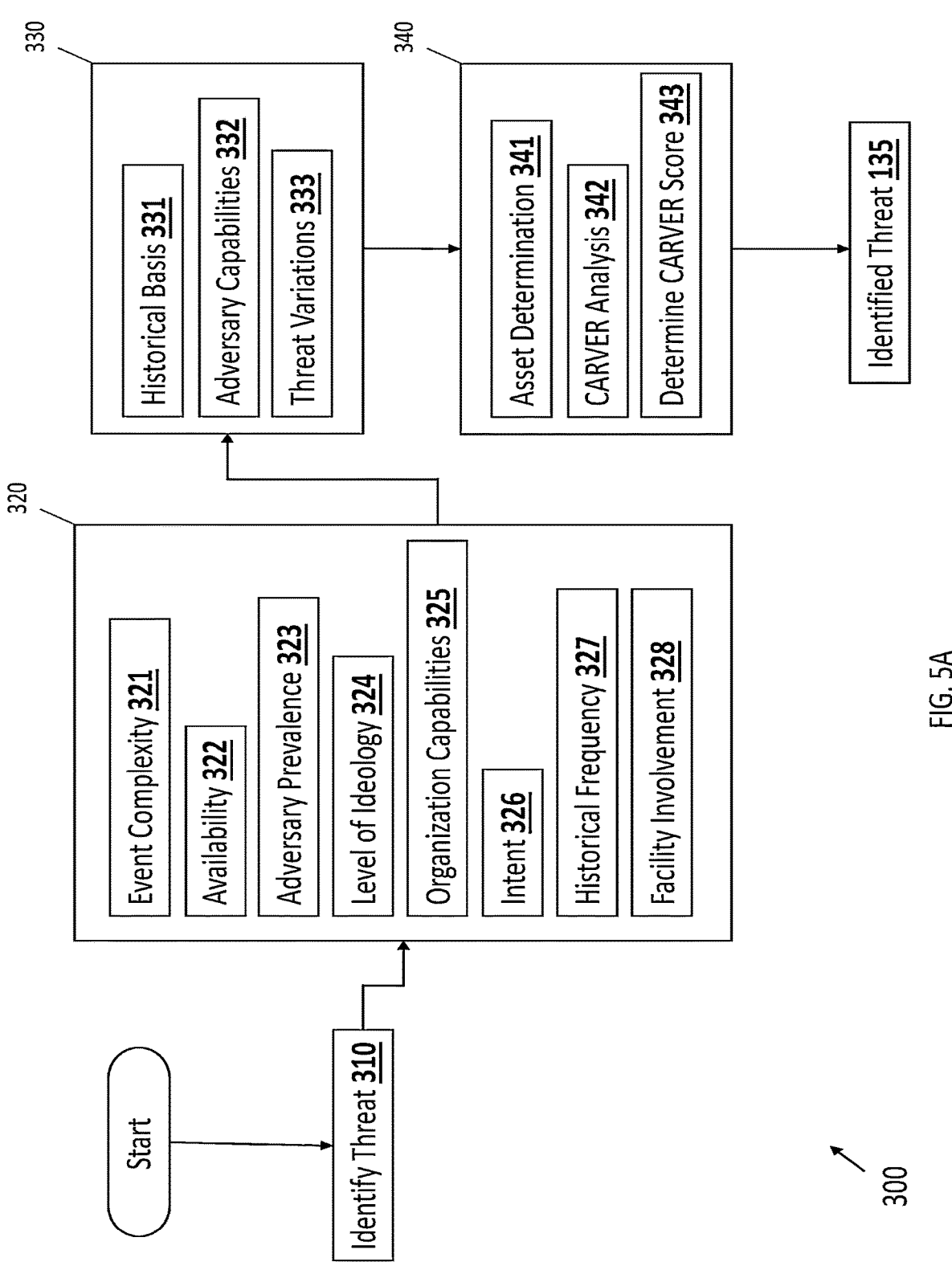
FIG. 5A depicts a schematic representation in block-diagram form of a method for determining an identified threat in accordance with the embodiment of the present invention depicted in FIG. 5.

One method of determining such an identified threat 135 may be seen with reference to FIG. 5A. Depicted therein is an evaluation routine 300 which may be used in accordance with at least one embodiment of the present invention. As may be seen, such an evaluation method 300 may first identify the threat 310 presented by such threat framework 129. Subsequent to such identification 310, such an evaluation method 300 may then analyze such threat to determine 320 a plurality of data associated with such threat. For instance, such an evaluation method 300 may be disposed to determine, without limitation, the event complexity 321, the availability 322 of certain systems, applications, and data to users and/or the organization in the event of such threat, the adversary prevalence 323, the level of ideology 324 associated with such threat, the capabilities of the organization 325 in the face of such a threat, the intent 326 behind such threat, the historical frequency 327 of such a threat, and the involvement of the organization's facilities 328 in the event of such a threat. Moreover, the evaluation method 300 may likewise determine certain data which may serve to provide additional variables 330 to such threat, such as the historical basis 331 of such a threat, the capabilities of the adversary 332 behind such a threat, and any variations 333 the threat may take-on.

With such gathered data, such an evaluation routine 200 may then perform certain appraisal tasks 340 disposed to determine, for instance, the risks and vulnerabilities inherent in such threat 310. For instance, such appraisal tasks 340 may comprise asset determination 341 and/or identification tasks designed to uniquely identify assets based on known identifiers and/or known information about such assets. Likewise, such appraisal tasks 340 may comprise a diagnostic assessment designed to identify and rank the targets of such threat to determine such risks and vulnerabilities inherent in same. For instance, one such diagnostic assessment may comprise the application of a CARVER analysis 342, and a subsequent determination of a CARVER score 343 in accordance therewith. Alternative analytical assessment methods may likewise be used and are envisioned in alternative embodiments of the present invention herein.

Specifically, under the CARVER analysis 342, the evaluation method 300 may determine a plurality of scores associated with the criticality, accessibility, remunerability, vulnerability, effect, and recognizability of the threat 310 and its effects on the user's baseline network architecture, such as the aforementioned determined assets 341. Subsequently, the evaluation method 300 may employ a CARVER matrix to determine a CARVER score 343 associated with each such determined asset 341. Accordingly, where the CARVER score 343 is deemed within the aforementioned specified threshold, it may be understood such threat 310 may be designated an identified threat 135, for which remedial actions should be taken.

Upon the determination of such an identified threat 135, the evaluation component 130 in accordance with at least one embodiment of the present invention may subsequently determine at least one theoretical control 136 which may be applied to remediate such identified threat 135, as may be seen in FIG. 5. Specifically, such an evaluation component 130 may be disposed to generate at least one theoretical control 136 designed to remediate the risks and vulnerabilities present in the identified threat 135. For instance, in embodiments utilizing the evaluation method 300 depicted in FIG. 5A, it may be understood the data gathered through the threat data 320 tasks and the additional variables 330 tasks, as embodied in the score garnered from the appraisal tasks 340 may serve to identify the specific assets determined 341 to be at risk, the problems with the user and/or organizations current baseline network architecture, and theoretical controls 136 which may be implemented therefor. As may be understood, such theoretical controls 136 may be developed according to, for instance, their propensity to reduce the probability or severity of the identified threat 135.

Upon the generation of such theoretical control(s) 136, the evaluation component 130 may then perform tasks designed to assess such theoretical control(s) 136 according to: (1) the criticality of the control, which represents the efficacy of such theoretical control 136 in remediating the identified threat 135; and (2) the volatility of such theoretical control 136, which represents the frequency with which such theoretical control 136 may remediate the identified threat 135. Accordingly, upon the determination of such criticality and volatility scores, the evaluation component 130 may determine an implementation priority 137 for each theoretical control 136, which may comprise the product of such criticality and volatility scores. As may be understood, such implementation priority 137 may be utilized to direct the technical implementation requirements of such theoretical controls 136. Additionally, at least one further embodiment of the present invention may allow for such criticality and volatility scores to be configurable or otherwise subject to change by a user and/or organization, thereby providing greater variability to the analysis of such theoretical control(s) 136.

Figure 6:
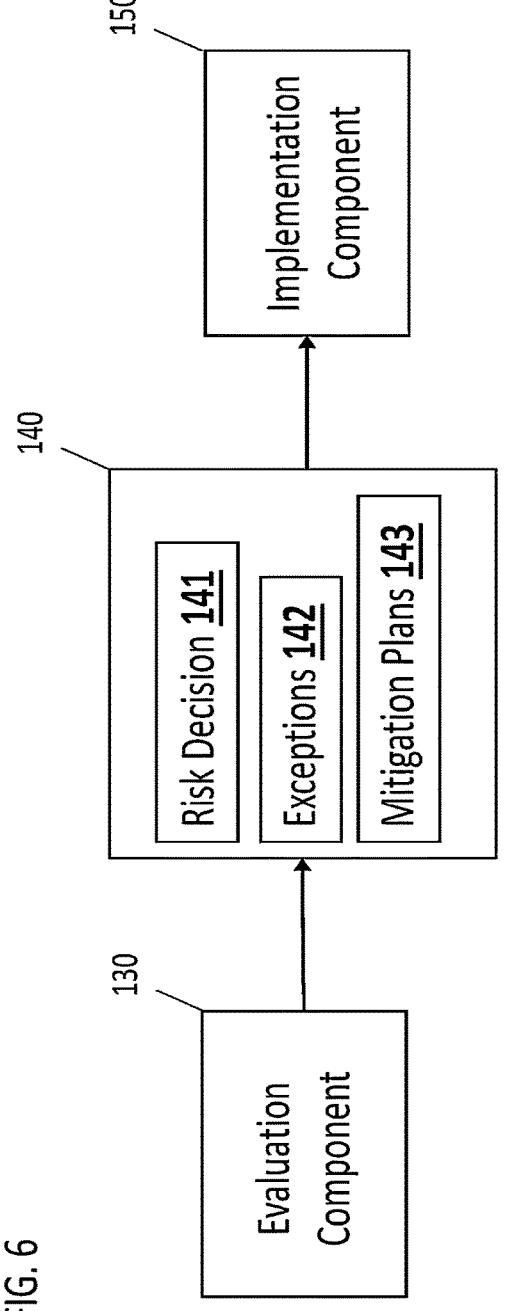
FIG. 6 depicts a schematic representation in block-diagram form of a documentation component in accordance with the embodiment of the present invention depicted in FIG. 2.
Figure 7:
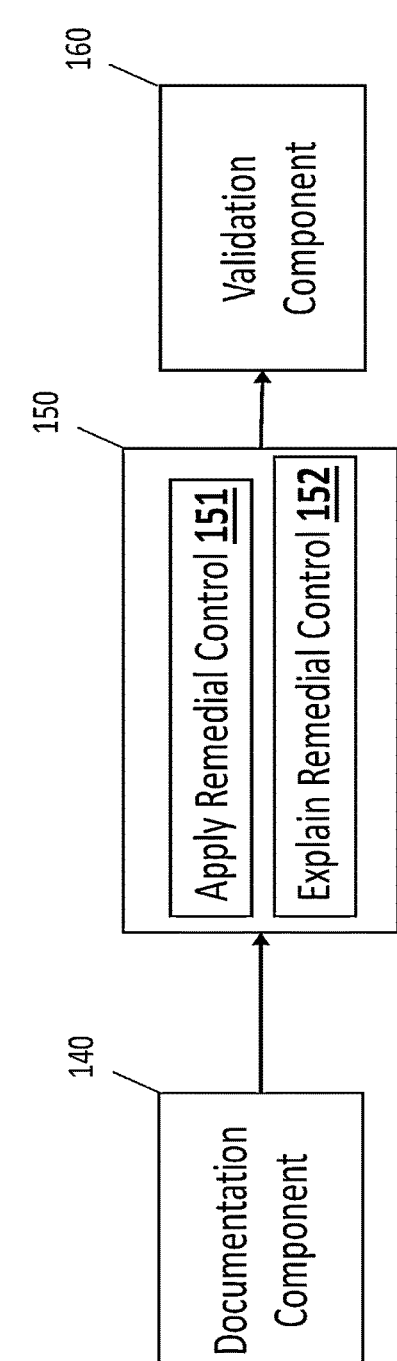
FIG. 7 depicts a schematic representation in block-diagram form of an implementation component in accordance with the embodiment of the present invention depicted in FIG. 2.

Subsequent to employing such evaluation component 130, at least one embodiment of the present invention may utilize a documentation component 140, disposed to record such identified threats 135, theoretical control(s) 136, and implementation priorities 137. As may be seen with reference to FIG. 6, such a documentation component 140 may record, for example, the risk decision 141 associated with such identified threat 135, the exceptions 142 applicable thereto, and any mitigating plans 143 developed in accordance therewith, such as, for instance, the aforementioned theoretical control(s) 136 developed and the implementation priority 137 associated with same. In this manner, a system in accordance with at least one embodiment of the present invention may allow an organization to maintain sufficient documentation pertinent to their cybersecurity compliance, maturity, and effectiveness. Such documentation may be used, for instance, in deciding whether to implement certain remedial controls, determining appropriate values for residual risk, generating risk management strategies at an organizational level, training employees, and determining an appropriate remediation strategy in the event such an identified threat 135 is realized in the physical environment.

Further, in at least one embodiment of the present invention may be an implementation component 150, disposed in connection with the aforementioned components of the system 100. Specifically, such implementation component 150 may be disposed to direct, coordinate, or otherwise implement remedial control(s) 151 garnered from the evaluation component 130. For instance, according to the applicable identified threat 135, the developed theoretical control(s) 136, and the implementation priority 137 determined therefrom, such implementation component 150 may be disposed to apply an appropriate remedial control 151 to the user and/or organization's network security architecture and/or to the already determined baseline.

In accordance with such implementation of a remedial control 151, the implementation component 150 may likewise comprise a notification component included therein, wherein such notification component is disposed to explain the remedial control 151 to be implemented. For instance, such explanation of the remedial control 151 may serve to notify and inform the user and/or organization of the remedial control 151 and the pertinent data associated therewith, such as, for instance, data pertaining to analytical options, risk treatment options, and the risk dynamic impact on the associated identified threat 135. Such notification component may notify the user and/or organization through a plurality of appropriate notification means, such as, without limitation, email or text messaging systems. As may be understood, such notification component may further be disposed in input-output relation with the system of the present invention, thereby allowing a user to authorize the implementation of such remedial controls. Accordingly, in this manner, the implementation component 150 of the present invention may be designed to automatically implement such remedial controls, or alternatively, request approval prior to such implementation. Likewise, such implementation component 150 may comprise a predetermined configuration designating whether such remedial control 151 is to be automatically implemented, deferred according to specified criteria, or otherwise delegated to additional personnel for approval or denial.

Figure 8:
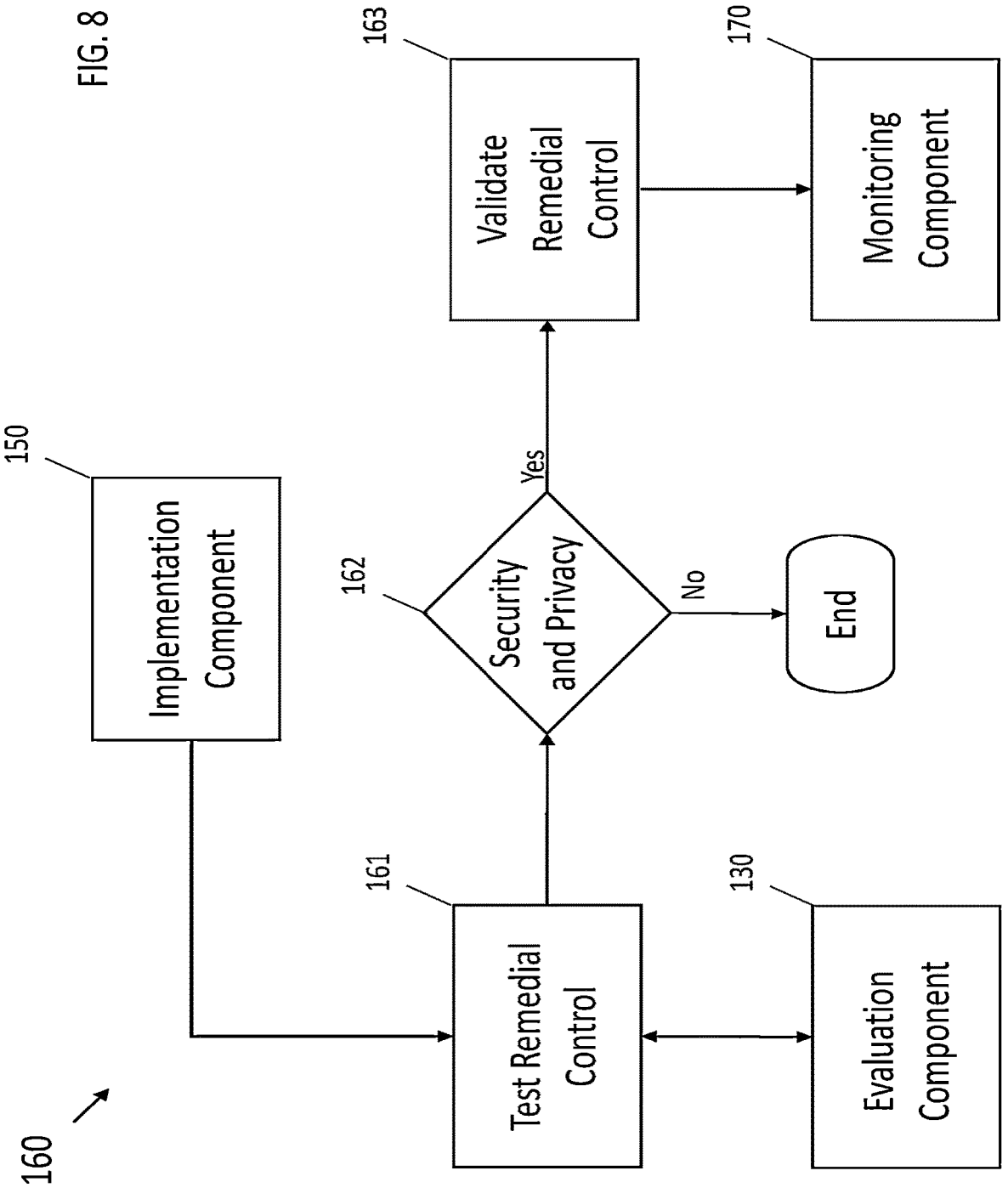
FIG. 8 depicts a schematic representation in block-diagram form of a validation component in accordance with the embodiment of the present invention depicted in FIG. 2.

Upon implementation of such remedial control(s), at least one embodiment of the present invention may further comprise a validation component 160, disposed to test and validate the efficacy of such remedial control 151, as depicted in FIG. 8. Specifically, such a validation component 160 may be disposed to, upon the implementation of such remedial control 151, reapply the aforementioned evaluation component 130 to determine whether the same, or any alternative, identified threats 135 are present in the remediated network architecture. In this manner, real-world data, such as asset disposition, threats, and vulnerabilities, may be assessed through within scenarios focused on the identified threat 135. Likewise, the validation component 160 may operate to ensure the security and privacy requirements 162 present in the organization are sufficiently achieved by the implementation of such remedial control 151. Accordingly, utilizing such process, such remedial control 151 may be validated 163. In so doing, the efficacy of such remedial control 151 may be evaluated, both at a discrete individual control-based level, and as part of a network architecture as a whole. In this manner, the compliance, maturity, and effectiveness of an organization's network security architecture may be both enhanced, and continually tested, thereby ensuring the organization is continually monitoring and adapting their cybersecurity network in real time and ensuring residual risk is maintained within the organization's determined risk appetite.

Figure 9:
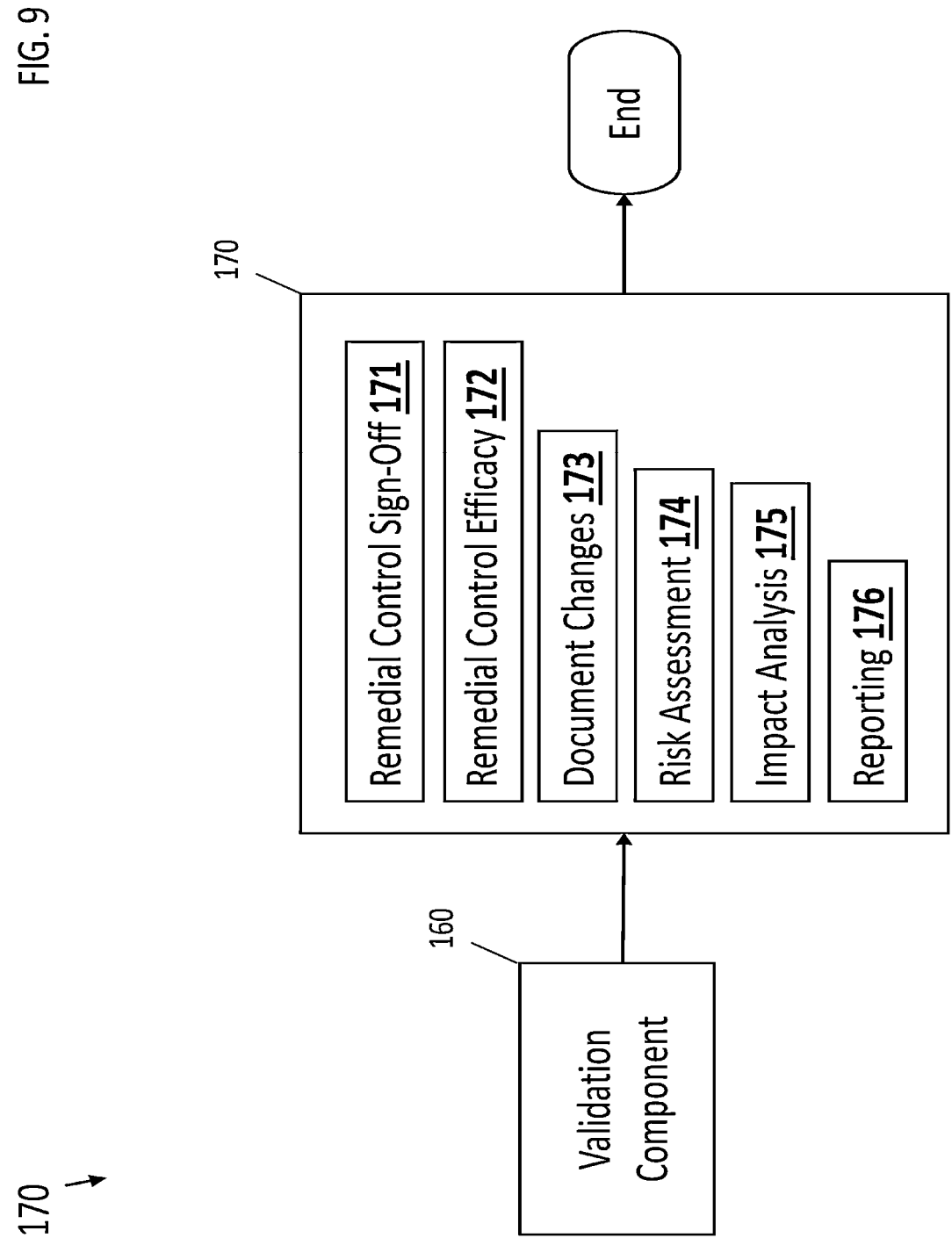
FIG. 9 depicts a schematic representation in block-diagram form of a monitoring component in accordance with the embodiment of the present invention depicted in FIG. 2.

Further, in at least one embodiment of the present invention, a monitoring component 170 may be disposed in connection with the aforementioned components of the system 100, as depicted in FIG. 9. As may be understood, such a monitoring component 170 may monitor the organization's cybersecurity network, for the identification of both real-world threats, and ineffective controls. In accordance therewith, such a monitoring component may further be disposed to provide certain documentation and auditing procedures, thereby continually monitoring and remediation organization's cybersecurity compliance, maturity, and effectiveness. For instance, such a monitoring component may be disposed to perform certain monitoring and auditing tasks, such as, without limitation, remedial control sign-off 171 tasks, remedial control efficacy 172 tasks, document change 173 monitoring tasks, risk assessment 174 tasks, impact analysis 175 tasks, and general reporting 176 tasks. For instance, such risk assessment 174 may be determined according to the layering of threat and vulnerability data, as compared to control criticality and volatility, as determined in the aforementioned components of the system 100.

In accordance with the aforementioned components of the present invention, such a system may further comprise yet additional components designed to further improve a user and/or organization's cybersecurity in real time. For instance, such a system, in at least one embodiment of the present invention, as depicted in FIG. 1, may further comprise a machine learning component 40 disposed in connection with the system 100 of the present invention and an interconnected data warehouse 30. In this manner, such a machine learning component 40 may be disposed to improve certain components of the present invention, such as, for instance, the evaluation component 130 and the implementation component 150, according to training provided by the organization and/or end-users.

For instance, such a machine learning component 40 may, upon the training provided through both real world and hypothetical scenarios enacted through the system of the present invention, determine appropriate instances for notifications, assignments, and improvements to decision making. In such manner, by continually tracking, for instance, real-world threat scenarios, end-user decision making and inputs, and the efficacy of remedial controls, the machine learning may, for instance, develop more appropriate threat frameworks to be applied to a user's baseline network. In so doing, the machine learning component may be used to ensure the threat frameworks 129 proffered through the system of the present invention remain up-to-date, thereby allowing the security network of users and/or organizations to remain disposed in the present, and not at some static point of time in the past.

Likewise, the system 100 may be disposed in connection with a plurality of data feeds 20, whether part of a given organization's network architecture, or otherwise, such as data feeds garnered from interconnected third-party systems, applications, and networks. For instance, such third party data feeds 20 may be used to determine a risk tier according to the provided services of such third-party, wherein such risk tiers may comprise, for instance: (1) an impact on the organizational mission and//or business; and (2) the product of the sensitivity and associated volume of critical data. Accordingly, using such risk tiers, third-party data feeds 20 may be assessed as to their risk profile, thereby impacting the baseline generated by the profiling component 110.

As may be understood, the application of the present invention may be performed continuously, at certain predetermined intervals, or at the user's discretion, thereby allowing the user and/or organization to continuously tune their network security architecture and allow for the prevention of real-world threat scenarios. For instance, the system 100 may adapt and repeat certain components, such as, without limitation, the evaluation component 130, the implementation component 150, and the validation component 160, to allow real time changes to the organization's network security architecture. Moreover, such an application may also be used in a reactive manner, such as when a real-world change in asset criticality, such as when an important system loses its backup and becomes critical, when threat agents, tactics, techniques, or procedures evolve, or when vulnerabilities are discovered. In such instances, it may be understood such changes may be incorporated into the organization's baseline, for the subsequent processing through the components of the system 100, for the determination of remedial controls or accepted risks.

Accordingly, the present invention may enable the provision of specific recommendations on improving an organization's cybersecurity compliance, maturity, and effectiveness through a continuous cycle of tuning the organization's network security architecture based on real-world operations and evaluations against theoretical risk variables. Thus, in this manner, the application in accordance with at least one embodiment of the present invention may provide the ability to process, and thereby adaptively adjust an organization's network security architecture in real time according to scenario-based control efficacy and residual risk. In so doing, ineffective controls may be identified and remediated, thereby allowing organizations to assess, implement, and adapt to changes in network security as they occur.

Since many modifications, variations, and changes in detail may be made to the described preferred embodiment of the present invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for processing cyber-risk in real time, the system comprising:
   a profiling component configured to determine at least one baseline of a user, the at least one baseline of the user comprising an expected operations for a network's security compliance at least one control level;
   an analytic component configured to generate at least one threat framework;
   an evaluation component configured to:
   utilize the threat framework to organize at least one theoretical threat against an organization's determined baseline network security;
   determine at least one theoretical control according to the at least one theoretical threat; and
   determine at least one implementation priority according to the at least one theoretical control; and
   an implementation component configured to implement at least one remedial control according to the at least one theoretical control and the at least one implementation priority.

2. The system of claim 1, wherein utilizing the threat framework includes utilizing golden images in a sandbox environment to determine at least one identified threat from the at least one threat framework applied to the at least one baseline of the user, wherein the golden images are representative of the expected operations for the network's security compliance.

3. The system of claim 1, wherein utilizing the threat framework includes accessing a subset of approved nodes, the subset of the approved nodes derived from the at least one baseline of the user, and run the at least one threat framework within the subset of the approved nodes to determine the at least one theoretical threat.

4. The system of claim 1, wherein the at least one implementation priority is determined according to a criticality of the at least one theoretical control.

5. The system of claim 1, wherein the at least one implementation priority is determined according to a volatility of the at least one theoretical control.

6. The system of claim 1, wherein the profiling component is configured to determine the at least one baseline of the user according to at least two data feeds.

7. The system of claim 1, wherein the at least one threat framework is determined according to an analytic routine.

8. The system of claim 1, wherein the theoretical control is configured to remediate a risk of the at least one theoretical threat.

9. A system for processing cyber-risk in real time, the system comprising:

a profiling component configured to determine at least one baseline of a user, the at least one baseline of the user comprising an expected operations for a network's security compliance at least one control level;

an analytic component configured to generate at least one threat framework;

an evaluation component configured to:

utilize the threat framework to organize at least one theoretical threat against an organization's determined baseline network security, wherein utilizing the threat framework includes utilizing golden images representative of the expected operations for the network's security compliance in a sandbox environment to determine at least one identified threat from the at least one threat framework applied to the at least one baseline of the user;

determine at least one theoretical control according to the at least one theoretical threat; and determine at least one implementation priority according to the at least one theoretical control; and an implementation component configured to implement at least one remedial control according to the at least one theoretical control and the at least one implementation priority.

10. The system of claim 9, wherein the at least one implementation priority is determined according to a criticality of the at least one theoretical control.

11. The system of claim 9, wherein the at least one implementation priority is determined according to a volatility of the at least one theoretical control.

12. The system of claim 9, wherein the profiling component is configured to determine the at least one baseline of the user according to at least two data feeds.

13. The system of claim 9, wherein the at least one threat framework is determined according to an analytic routine.

14. The system of claim 9, wherein the theoretical control is configured to remediate a risk of the at least one theoretical threat.

15. A system for processing cyber-risk in real time, the system comprising:

a profiling component configured to determine at least one baseline of a user, the at least one baseline of the user comprising at least one control level;

an analytic component configured to generate at least one threat framework;

an evaluation component configured to:

utilize the threat framework to organize at least one theoretical threat against an organization's determined baseline network security, wherein utilizing the threat framework includes accessing a subset of approved nodes derived from the at least one baseline of the user, and run the at least one threat framework within the subset of the approved nodes to determine the at least one theoretical threat;

determine at least one theoretical control according to the at least one theoretical threat; and determine at least one implementation priority according to the at least one theoretical control; and an implementation component configured to implement at least one remedial control according to the at least one theoretical control and the at least one implementation priority.

16. The system of claim 15, wherein the at least one implementation priority is determined according to a criticality of the at least one theoretical control.

17. The system of claim 15, wherein the at least one implementation priority is determined according to a volatility of the at least one theoretical control.

18. The system of claim 15, wherein the profiling component is configured to determine the at least one baseline of the user according to at least two data feeds.

19. The system of claim 15, wherein the at least one threat framework is determined according to an analytic routine.

20. The system of claim 15, wherein the theoretical control is configured to remediate a risk of the at least one theoretical threat.

\* \* \* \* \*